United States Patent
Negi et al.

(10) Patent No.: US 9,559,851 B2
(45) Date of Patent: Jan. 31, 2017

(54) SECURE PAIRING FOR SECURE COMMUNICATION ACROSS DEVICES

(71) Applicant: Intel Corporation, Santa Clara, CA (US)

(72) Inventors: Ansuya Negi, Portland, OR (US); Erik J. Johnson, Portland, OR (US); Jiangtao Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,437

(22) PCT Filed: Jun. 13, 2013

(86) PCT No.: PCT/US2013/045690
§ 371 (c)(1),
(2) Date: Dec. 26, 2013

(87) PCT Pub. No.: WO2014/200496
PCT Pub. Date: Dec. 18, 2014

(65) Prior Publication Data
US 2016/0099814 A1    Apr. 7, 2016

(51) Int. Cl.
*H04L 9/32* (2006.01)
*H04B 5/00* (2006.01)
*H04L 9/08* (2006.01)

(52) U.S. Cl.
CPC ........... *H04L 9/3268* (2013.01); *H04L 9/0841* (2013.01)

(58) Field of Classification Search
CPC .............................. H04L 9/3268; H04L 9/0841
(Continued)

(56) References Cited

U.S. PATENT DOCUMENTS

2005/0086504 A1* 4/2005 You ..................... H04L 63/0435
713/193
2005/0238325 A1* 10/2005 Tanabe ................... G06F 21/10
386/261
(Continued)

OTHER PUBLICATIONS

International Search Report and Written Opinion received for PCT Application No. PCT/US2013/045690, mailed on Feb. 25, 2014, 11 pages.
(Continued)

*Primary Examiner* — Dede Zecher
*Assistant Examiner* — Abdullah Almamun
(74) *Attorney, Agent, or Firm* — Barnes & Thornburg LLP (57) ABSTRACT

Technologies for securely pairing a first computing device with a second computing device include the first computing device to generate a session message key based on a key exchange with the second computing device. The first computing device receives a message including a hardware key certificate, 5 a cryptographically-signed communication, and a message authentication code from the second computing device. The cryptographically-signed communication is signed with a private hardware key of the second computing device. The first computing device validates the message authentication code, the certificate, and the signature received from the second computing device. After validation, the first computing device 10 identifies a user of the second computing device based on user-identifying data received from the second computing device.

23 Claims, 7 Drawing Sheets

(58) Field of Classification Search
USPC .......................................................... 713/171
See application file for complete search history.

(56) References Cited

U.S. PATENT DOCUMENTS

| | | | |
|---|---|---|---|
| 2007/0005981 A1* | 1/2007 | Miyazawa | H04L 63/0428 713/176 |
| 2007/0234432 A1* | 10/2007 | Korkishko | H04L 63/0492 726/27 |
| 2008/0003997 A1* | 1/2008 | Parkkinen | H04L 63/145 455/421 |
| 2010/0016007 A1* | 1/2010 | Satake | H04W 4/08 455/518 |
| 2010/0287369 A1* | 11/2010 | Monden | G06F 21/32 713/156 |
| 2011/0161660 A1 | 6/2011 | Zhang et al. | |
| 2011/0231650 A1 | 9/2011 | Coulier | |
| 2012/0023334 A1 | 1/2012 | Brickell et al. | |
| 2012/0114124 A1 | 5/2012 | Du et al. | |
| 2012/0173877 A1 | 7/2012 | Pendakur et al. | |
| 2013/0029596 A1* | 1/2013 | Preston | H04L 63/18 455/41.1 |
| 2013/0091353 A1* | 4/2013 | Zhang | H04L 9/3268 713/156 |
| 2014/0082701 A1* | 3/2014 | Pasion | G06F 21/10 726/4 |

OTHER PUBLICATIONS

Hugo Krawczyk, "SIGMA: the SIGn-and-MAc' Approach to Authenicated Diffie-Hellman and its Use in the IKE Protocols", Jun. 12, 2003, downloaded from http://www.ee.technion.ac.il/"hugo/sigma.html.

* cited by examiner

SECURE PAIRING FOR SECURE COMMUNICATION ACROSS DEVICES

CROSS REFERENCE TO RELATED APPLICATIONS

This application is a national stage entry 35 USC §371(b) of International Application No. PCT/US2013/045690, which was filed Jun. 13, 2013.

BACKGROUND

Establishing a secure communication connection (i.e., a secure pairing) between computing devices is critical to protecting the integrity and privacy of data transmitted between the devices over a network. Each computing device must verify the identity of the other computing device(s) to confirm, for example, that the data is being transmitted to the appropriate party (i.e., not a rogue computing device). Additionally, the data stored and/or transmitted among the computing devices may be private to a particular user or group of users (e.g., financial statements, legal documents, etc.) and, therefore, require that it is inaccessible to other users of the computing device. Accordingly, mechanisms are required to both establish secure communication connections and to authenticate the particular users of the computing devices.

A traditional means for establishing a secure pairing between computing devices is to use a trusted third party (e.g., a certificate authority or a trusted server) to authenticate the identities of the computing devices and to securely pair the computing devices by exchanging cryptographic keys (i.e., shared keys) between them. In doing so, the trusted third party acts as the root of trust and is trusted by each of the computing devices to operate securely and honestly. Alternatively, the computing devices may establish a secure communication connection by exchanging cryptographic keys over a near-field communication link. The security lies in the close proximity of the computing devices in such an embodiment.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
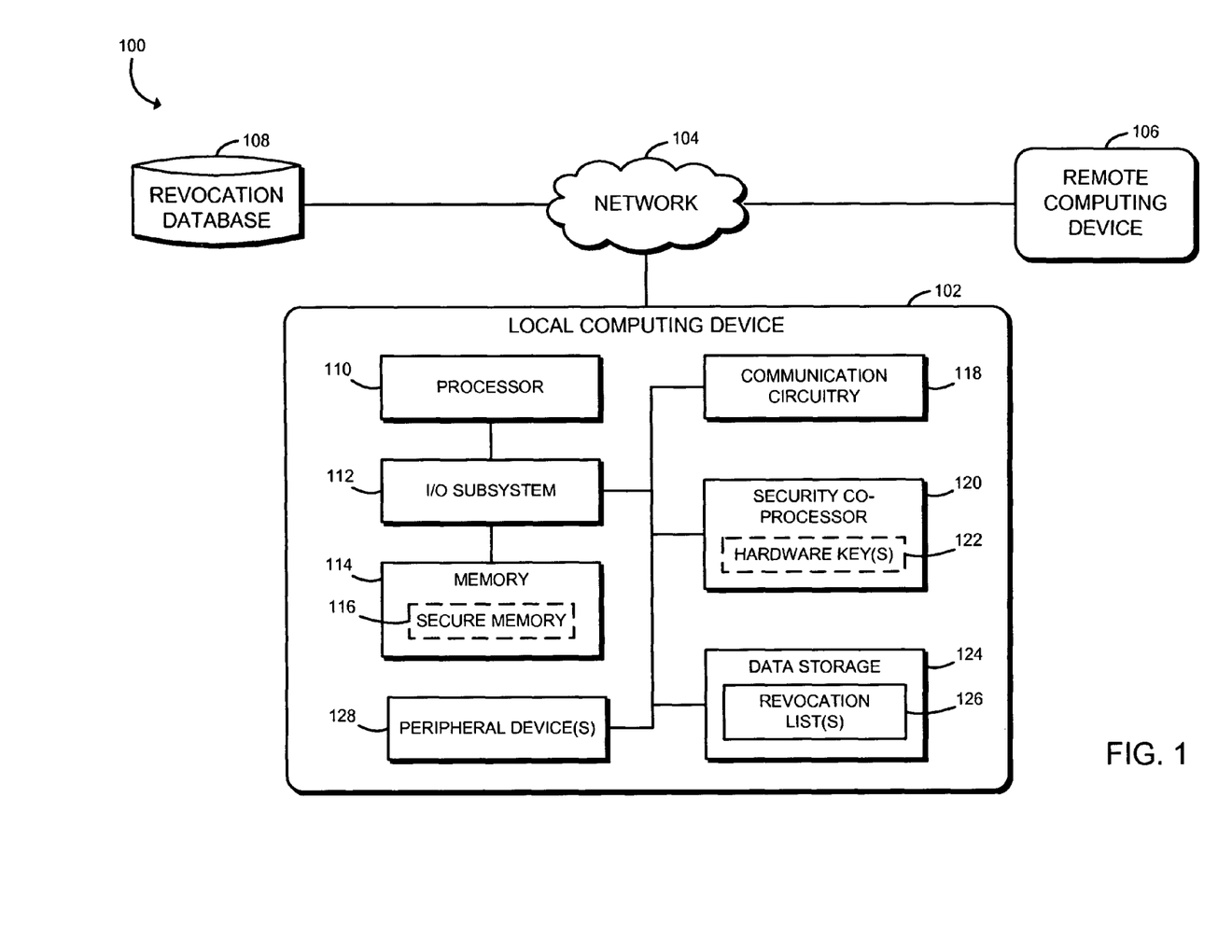
FIG. 1 is a simplified block diagram of at least one embodiment of a system for securely pairing computing devices.

Referring now to FIG. 1, in the illustrative embodiment, a system 100 for securely pairing computing devices includes a local computing device 102, a network 104, a remote computing device 106, and a revocation database 108. In use, as discussed in more detail below, the local computing device 102 and the remote computing device 106 may be securely paired without the aid of a trusted third party computing device (e.g., a certificate authority). The local computing device 102 may be embodied as any type of computing device capable of establishing a communication link with the remote computing device 106 and performing the functions described herein. For example, the local computing device 102 may be embodied as a tablet computer, laptop computer, cellular phone, smartphone, personal digital assistant, mobile Internet device, desktop computer, server, and/or any other computing/communication device. As shown in FIG. 1, the illustrative local computing device 102 includes a processor 110, an input/output ("I/O") subsystem 112, a memory 114, a communication circuitry 118, a security co-processor 120, a data storage 124, and one or more peripheral devices 128. Of course, the local computing device 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the local computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the local computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the local computing device 102, on a single integrated circuit chip. In some embodiments, the memory 114 includes a portion of secure memory 116, which may be used to store, for example, the hardware key(s) 122, hardware key certificates, and/or the revocation lists 126. Alternatively, in some embodiments, the secure memory 116 may be included on the security co-processor 120 or may be a separate partition of the memory 114 for use by the security co-processor 120.

The communication circuitry 118 of the local computing device 102 may be embodied as any communication circuit, device, or collection thereof, capable of enabling communications between the local computing device 102 and other remote devices (e.g., the remote computing device 106) over the network 104. The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The security co-processor 120 may be embodied as any hardware component(s) or circuitry capable of establishing a trusted execution environment. For example, the security co-processor 120 may be embodied as a Trusted Platform Module (TPM), a manageability engine (ME), or an out-of-band processor. In some embodiments, one or more hardware keys 122 are stored or provisioned into the security co-processor 120. For example, a private Enhanced Privacy Identification (EPID) key and/or another private hardware key may be provisioned into the security co-processor 120 during the manufacturing process of the security co-processor 120. In other embodiments, EPID or other hardware keys may be provisioned into one or more other components of the local computing device 102. Additionally, in some embodiments, a hardware key certificate (e.g., an EPID certificate) is also stored or provisioned into the security co-processor 120. The hardware key certificate may include the public hardware key corresponding to the private hardware key provisioned into the security co-processor 120 and may be signed by the manufacturer of the security co-processor 120. It should also be appreciated that, in some embodiments, the security co-processor 120 may directly communicate with a corresponding security co-processor of the remote computing device 106. Additionally, in some embodiments, the security co-processor 120 may establish an out-of-band communication link with remote devices and/or components (e.g., a security co-processor of the remote computing device 106).

As discussed in detail below, it should be appreciated that the EPID keys are associated with a group having a single public EPID key and a particular group identification (Group ID or GID). Any private EPID key, of which there may be many, belonging to the group may be paired with a corresponding public EPID key as a valid public-private cryptographic pair. For example, the security co-processor 120 of the local computing device 102 may have one private EPID key and a security co-processor of the remote computing device 106 may have a different private EPID key. If the security co-processor 120 of the local computing device 102 and the security co-processor of the remote computing device 106 are members of the same group (e.g., the same manufacturing lot), then their private EPID keys are valid asymmetric key pairs with the same public EPID key. Additionally, EPID keys allow both anonymity and unlinkability of the members. In other embodiments, another one-to-many hardware-based cryptographic scheme may be used. Further, in some embodiments, a trusted application is used as a root of trust rather than hardware (e.g., the security co-processor 120). In such an embodiment, the hardware key may be provisioned into the platform running the application.

The data storage 124 may be embodied as any type of device or devices configured for short-term or long-term storage of data such as, for example, memory devices and circuits, memory cards, hard disk drives, solid-state drives, or other data storage devices. As shown in FIG. 1, the data storage 124 includes one or more revocation lists 126. As discussed below, the revocation lists 126 may be used to verify that the hardware keys 122 of the remote computing device 106 have not been revoked (e.g., based on the group identification of the hardware key of the remote computing device 106). It should be appreciated that the revocation lists 126 allow the local computing device 102 to determine, for example, private key revocation, signature-based revocation, and group public key revocation. The local computing device 102 may periodically retrieve updated revocation lists 126 from the revocation database 108 in order to maintain current revocation lists 126. In some embodiments, the revocation lists 126 and/or the hardware key certificate may be transmitted to embedded hardware of the local computing device 102 while preparing the device (e.g., prior to or upon boot). The one or more peripheral devices 128 of the local computing device 102 may include any number of additional peripheral or interface devices. The particular devices included in the peripheral devices 128 may depend on, for example, the type and/or intended use of the local computing device 102.

The network 104 may be embodied as any type of communication network capable of facilitating communication between the local computing device 102 and remote devices (e.g., the remote computing device 106). As such, the network 104 may include one or more networks, routers, switches, computers, and/or other intervening devices. For example, the network 104 may be embodied as, or otherwise include, one or more cellular networks, telephone networks, local or wide area networks, publicly available global networks (e.g., the Internet), ad hoc networks, or any combination thereof.

The remote computing device 106 may be embodied as any type of computing device capable of performing the functions described herein. For example, in some embodiments, the remote computing device 106 may be similar to the local computing device 102 as described above. That is, the remote computing device 106 may be embodied as a tablet computer, laptop computer, cellular phone, smartphone, personal digital assistant, mobile Internet device, desktop computer, server, and/or any other computing/communication device. Further, the remote computing device 106 may include components similar to those of the local computing device 102 discussed above. The description of those components of the local computing device 102 is equally applicable to the description of components of the personal remote computing device 106 and is not repeated herein for clarity of the description. Further, it should be appreciated that the remote computing device 106 may include other components, sub-components, and devices commonly found in a computing device, which are not discussed above in reference to the local computing device 102 and not discussed herein for clarity of the description. It should be appreciated that the remote computing device 106 may be remote only in the sense that it is not a part of the local computing device 102. In other words, the remote computing device 106 may be in close proximity to the local computing device 102 in some embodiments.

The revocation database 108 may store current revocation lists 126, which may be retrieved by the local computing device 102 and/or the remote computing device 106 (e.g., periodically). As discussed below, the local computing device 102 may receive the group identification of the remote computing device 106 over the network 104. In some embodiments, the group identification identifies a hardware key group of the security co-processor of the remote computing device 106 (e.g., an EPID group). Although the group identification may specifically identify a particular hardware component of a computing device, for simplicity, the group identification may be referred to herein generally as being a group identification "of the computing device." The local computing device 102 determines whether, for example, the EPID key of the remote computing device 106 has been revoked. In some embodiments, the revocation database 108 may include one or more revocation lists 126 associated with private key revocation, signature-based revocation, and group public key revocation. The revocation database 108 may be embodied as any combination of hardware, software, and/or firmware suitable for performing the functions described herein. For example, the revocation database 108 may be embodied as an independent database server computer in some embodiments. Additionally, although only one local computing device 102, one network 104, one remote computing device 106, and one revocation database 108 are illustratively shown in FIG. 1, the system 100 may include additional computing devices 102, 106, networks 104, and/or revocation databases 108 in some embodiments. For example, the local computing device 102 may retrieve revocation lists 126 multiple revocation databases 108 in some embodiments.

Figure 2:
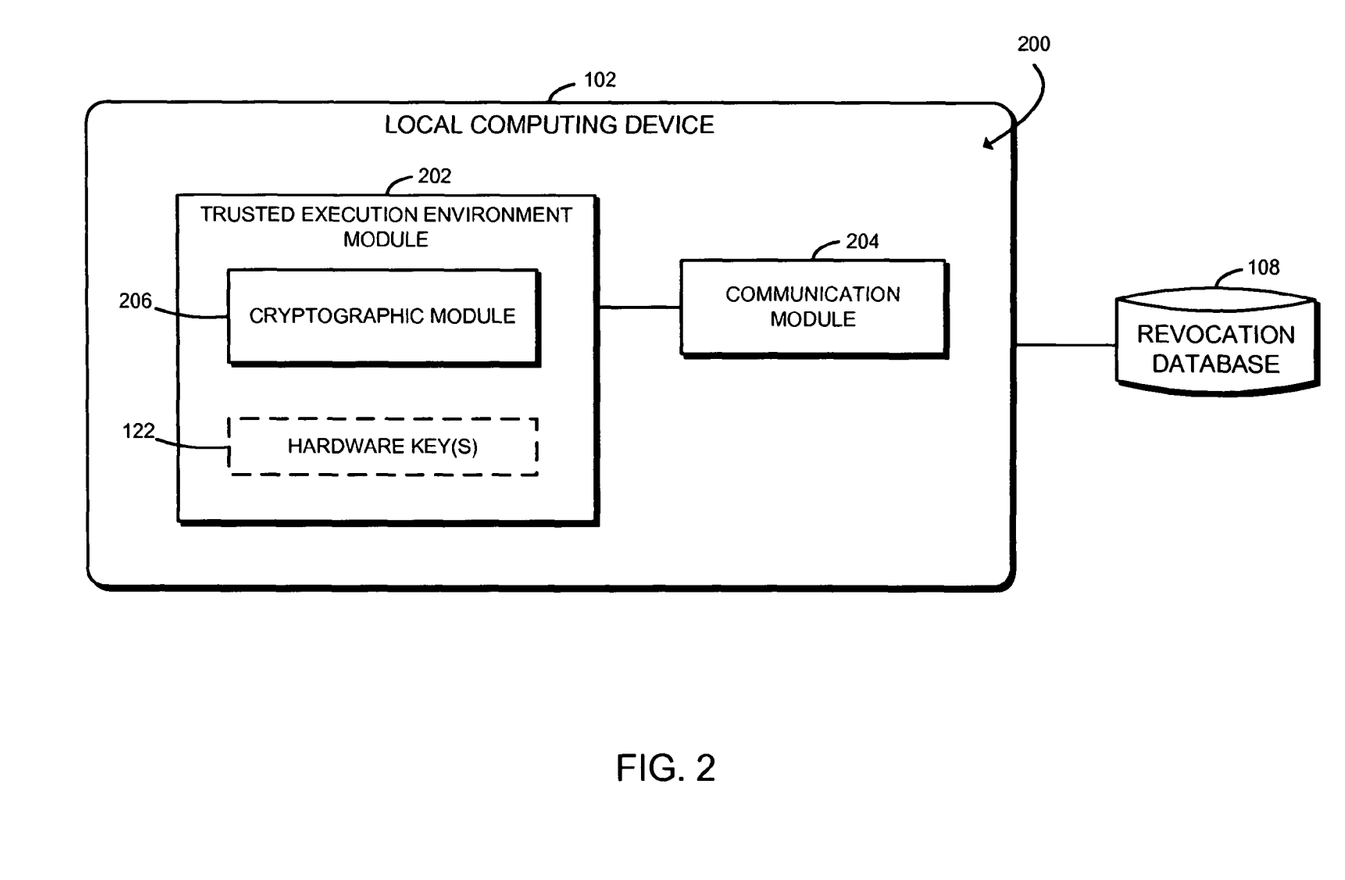
FIG. 2 is a simplified block diagram of at least one embodiment of an environment of the local computing devices of the system of FIG. 1.

Referring now to FIG. 2, in use, the local computing device 102 establishes an environment 200 for securely pairing with the remote computing device 106. The environment 200 in the illustrative embodiments includes a trusted execution environment module 202 and a communication module 204. Additionally, the trusted execution environment module 202 includes a cryptographic module 206 and may also include the hardware keys 122. Each of the trusted execution environment module 202, the communication module 204, and the cryptographic module 206 may be embodied as hardware, software, firmware, or a combination thereof.

As discussed in more detail below, the trusted execution environment module 202 may establish a secure and trusted execution environment for the local computing device 102. In some embodiments, the security co-processor 120 includes the trusted execution environment module 202. That is, the trusted execution environment module 202 may be incorporated into or executed by the security co-processor 120. Further, in some embodiments, the hardware keys 122 stored in the security co-processor 120 may only be accessed by the trusted execution environment module 202. The trusted execution environment module 202 may also be configured to authenticate a user based on user-identifying data. In some embodiments, the trusted execution environment module 202 may identify a user based on, for example, a personal identification number (PIN), email address, password, quick response (QR) code, and/or other data uniquely identifying the user or a group of users.

The cryptographic module 206 performs various cryptographic functions for the local computing device 102. In the illustrative embodiment, the cryptographic module 206 is embodied as a module of the trusted execution environment module 202. In other embodiments, the cryptographic module 206 may be embodied as a cryptographic engine, an independent security co-processor of the local computing device 102, a cryptographic accelerator incorporated into the processor 110, or a stand-alone cryptographic software/firmware. In some embodiments, the cryptographic module 206 may establish a secure connection with remote devices (e.g., the remote computing device 106) over the network 104. For example, the cryptographic module 206 may encrypt and decrypt communications between the local computing device 102 and the remote computing device 106. More specifically, the cryptographic module 206 may perform a key exchange with the remote computing device 106 or a component of the remote computing device 106 (e.g., a corresponding security co-processor). For example, the cryptographic module 206 may perform a Diffie-Hellman key exchange, and Elliptic Curve Diffie-Hellman key exchange, or another suitable cryptographic key exchange protocol with the remote computing device 106. Based on the generated shared key, the cryptographic module 206 may generate one or more other cryptographic keys (e.g., session keys).

Additionally, the cryptographic module 206 may cryptographically sign outgoing communications and verify incoming cryptographic signatures. For example, the cryptographic module 206 may sign a message using the private hardware key (e.g., a private EPID key) of the local computing device 102. In order to verify signatures of incoming messages, the cryptographic module 206 may use corresponding public cryptographic keys received from the relevant parties (e.g., a manufacturer of the hardware components and/or a certificate authority). The cryptographic module 206 is also configured to generate hashes (e.g., keyed hashes) using one or more suitable algorithms, functions, or mechanisms. For example, as discussed below, the cryptographic module 206 may generate a message authentication code (MAC) of a message based on, for example, a session key shared between the local computing device 102 and the remote computing device 106. Additionally, the local computing device 102 may perform a key exchange protocol including a MAC such as a Sign-and-MAC (SIGMA) protocol. The communication module 204 handles the communication between the local computing device 102 and remote computing devices (e.g., the remote computing device 106) through the network 104. As discussed in detail below, the communication module 204 may transmit and receive various cryptographic keys and encrypted communications to securely pair the local computing device 102 to the remote computing device 106.

Figure 3:
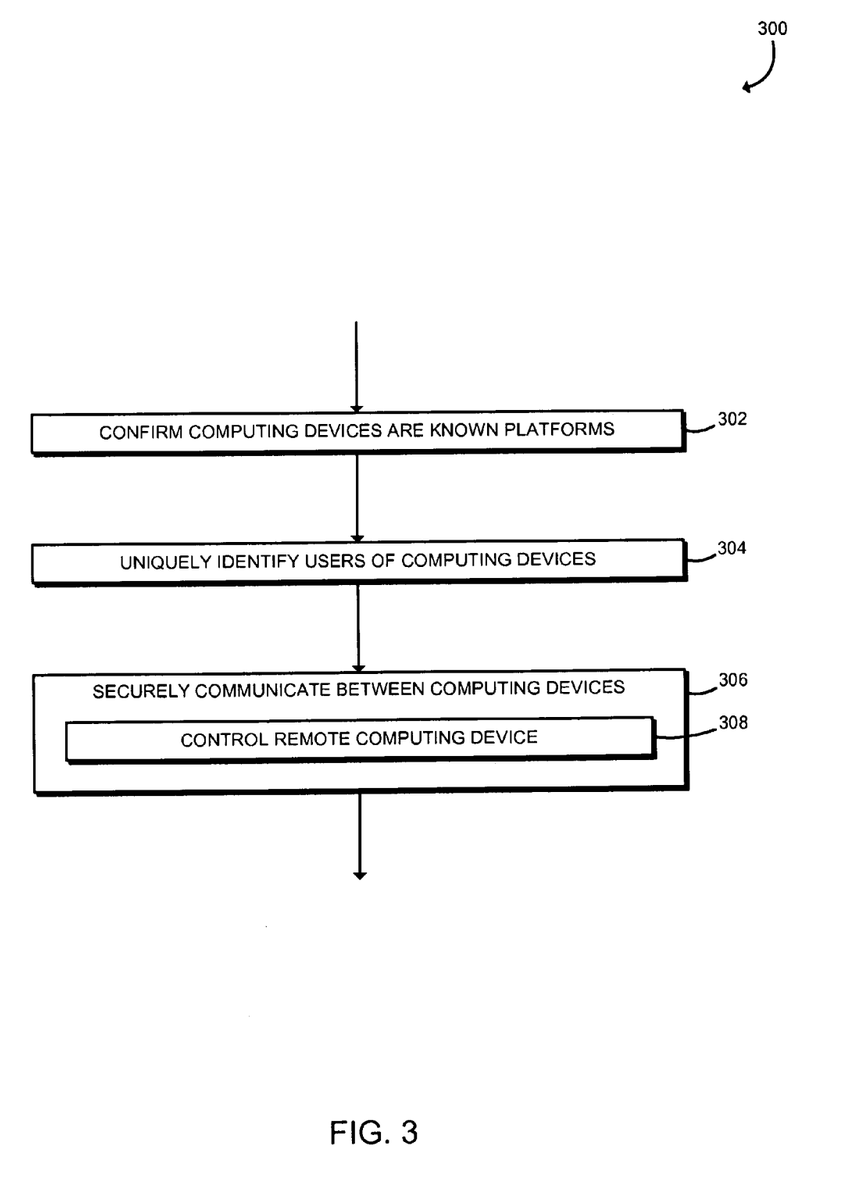
FIG. 3 is a simplified flow diagram of at least one embodiment of a method for securely communicating between the local computing device and the remote computing device of the system of FIG. 1.

Referring now to FIG. 3, in use, the system 100 may execute a method 300 for securely communicating between the local computing device 102 and the remote computing device 106. The illustrative method 300 begins with block 302 in which the computing devices 102, 106 confirm that the other computing device 102, 106 is a known platform or computing device and/or includes a known component (e.g., a security co-processor). In some embodiments, the local computing device 102 confirms that the remote computing device 106 includes a security co-processor having one or more hardware keys (e.g., an EPID key). Similarly, the remote computing device 106 may confirm that the local computing device 102 includes the security co-processor 120 and its associated hardware keys 122.

In block 304, each of the computing devices 102, 106 uniquely identifies the user of the other computing device 102, 106. That is, the local computing device 102 identifies the current user of the remote computing device 106, and the remote computing device 106 identifies the current user of the local computing device 102. The computing devices 102, 106 may use any suitable algorithms, functions, or mechanisms for doing so. For example, the local computing device 102 may verify a PIN, email address, password, or QR code provided by the user of the remote computing device 106. It should be appreciated that after the execution of blocks 302 and 304, the local computing device 102 knows, for example, that the remote computing device 106 is operating on a known platform and also knows the identity of the user operating the computing device 106. In some embodiments, if the local computing device 102 determines that the remote computing device 106 is not the particular platform or does not have the particular component (e.g., the security co-processor having a hardware key), the local computing device 102 discontinues the communication connection or otherwise handles the communication failure with the remote computing device 106. Similarly, if the local computing device 102 fails to authenticate the user of the remote computing device 106, the local computing device 102 discontinues the communication connection with the remote computing device 106 or otherwise handles the authentication failure. For example, the user of the remote computing device 106 may be prompted to re-enter the identification information.

In block 306, the local computing device 102 and the remote computing device 106 may securely communicate with one another after confirming the computing devices 102, 106 are on known platforms or include known components and after uniquely identifying the users of the computing devices 102, 106. For example, in block 308, the local computing device 102 may control the remote computing device 106 remotely in some embodiments. In order to do so, the local computing device 102 may establish access control settings and/or policies defining a manner in which the local computing device 102 may access hardware and/or software resources of the remote computing device 106 and for otherwise controlling the remote computing device 106, which may be updated remotely. It should be appreciated that this may permit, for example, a parent device (i.e., the local computing device 102) to remotely control usage of a child device (i.e., the remote computing device 106). In another embodiment, the method 300 may be used so as to permit the local computing device 102 to control a military computing device in a secure way.

Referring now to FIGS. 4-7, in use, the system 100 may execute a method 400 having a data flow 700 (see FIG. 7) for securely pairing the local computing device 102 with the remote computing device 106. The illustrative method 400 begins with block 402 of FIG. 4 in which a first computing device (i.e., one of the local computing device 102 and the remote computing device 106) determines whether to establish secure pairing between the first computing device 702 and a second computing device 704 (i.e., the other of the local computing device 102 and the remote computing device 106). If so, the first computing device 702 generates an ephemeral Diffie-Hellman private key, $DH_{priv1}$, in block 404. Similarly, the second computing device 704 generates another ephemeral Diffie-Hellman private key, $DH_{priv2}$. In block 406, the first computing device 702 derives a Diffie-Hellman public key, $DH_{pub1}$, based on the private key, $DH_{priv1}$. Additionally, the second computing device 704 derives another Diffie-Hellman public key, $DH_{pub2}$ based on the private key, $DH_{priv2}$.

Figure 4:
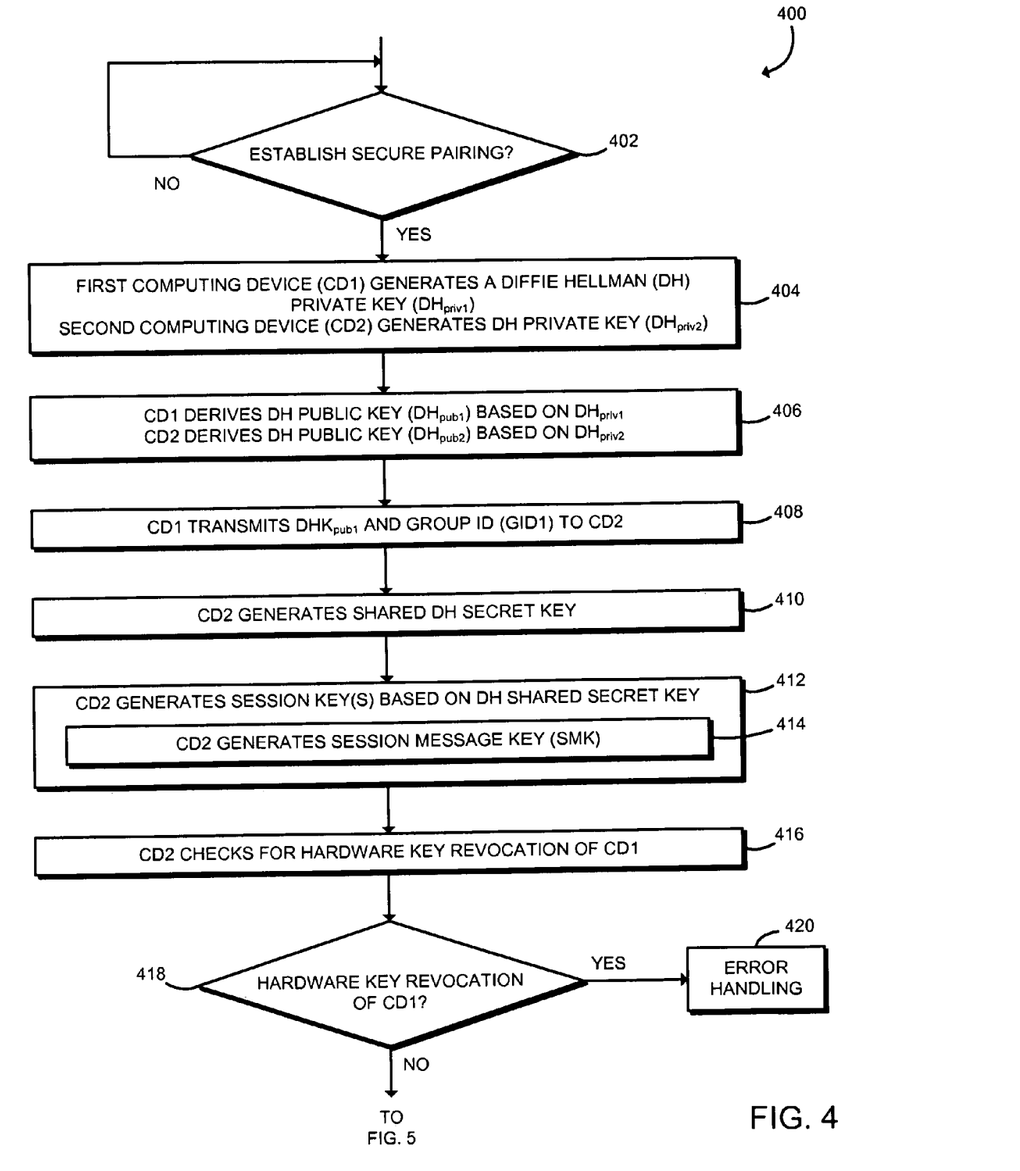
FIGS. 4-6 are a simplified flow diagram of at least one embodiment of a method for securely pairing the local computing device and the remote computing device of the system of FIG. 1.
Figure 7:
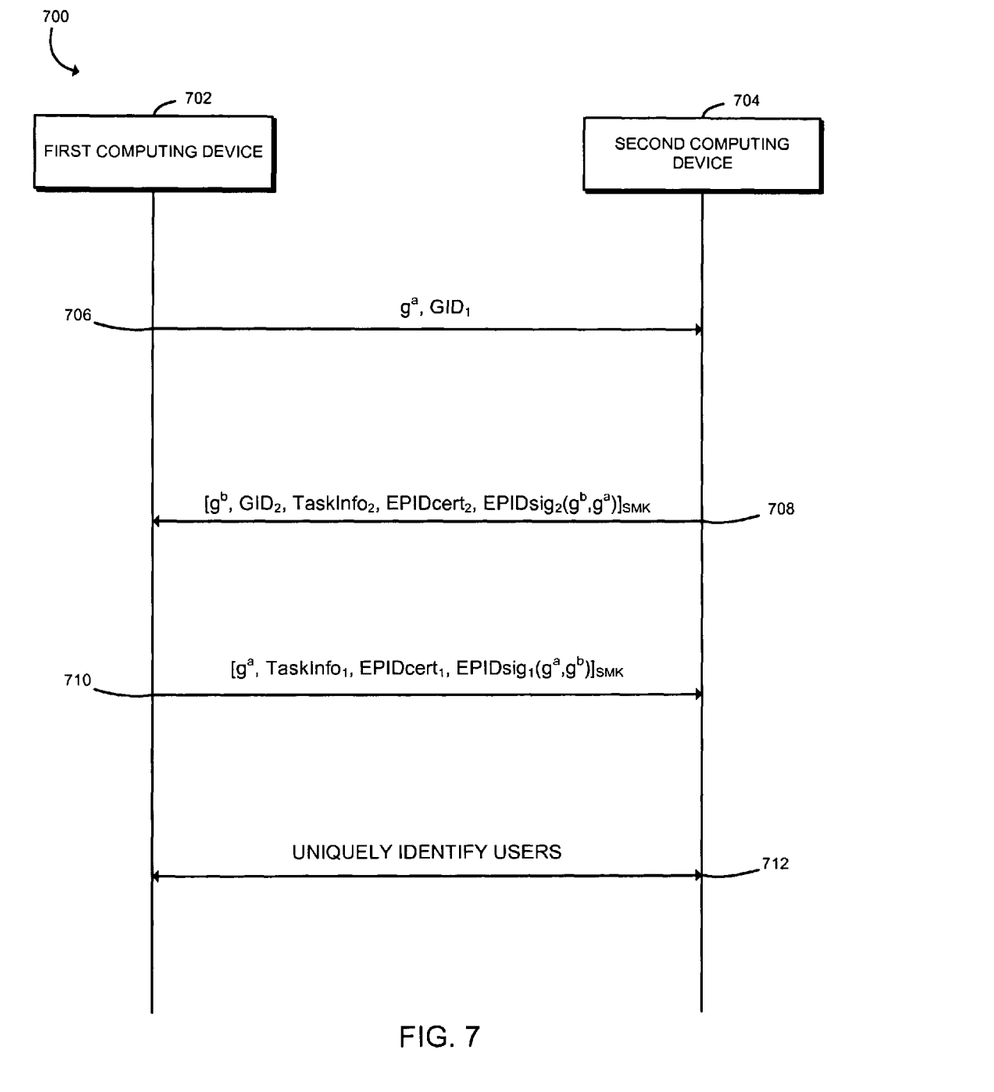
FIG. 7 is a simplified data flow diagram of at least one embodiment of the method of FIGS. 4-6.

In block 408, the first computing device 702 transmits the Diffie-Hellman public key, $DH_{pub1}$, and group identification (GID1) of the first computing device 702 to the second computing device 704 (see data flow 706 of FIG. 7). As discussed above, the group identification of the first computing device 702 may be determined based on the hardware key group (e.g., EPID group) of a hardware key of a security co-processor of the first computing device 702. In block 410, the second computing device 704 generates a shared Diffie-Hellman secret key based on the Diffie-Hellman private key, $DH_{priv2}$, of the second computing device 704 and the Diffie-Hellman public key, $DH_{pub1}$, received from the first computing device 702. Although the illustrative embodiment describes a system 100 in which a Diffie-Hellman key exchange is incorporated into the method 400, in other embodiments, another key exchange protocol may be used.

In block 412, the second computing device 704 generates one or more session keys based on the shared Diffie-Hellman secret key. For example, the second computing device 704 may generate a session message key (SMK) in block 414. Additionally, the second computing device 704 may generate a session integrity key, a session confidentiality key, and/or other session keys in some embodiments. As discussed below, the session message key may be used to MAC messages between the first computing device 702 and the second computing device 704. The session integrity key, the session confidentiality key, and/or other session keys may be used, for example, for subsequent communications (i.e., communications after the first computing device 702 and the second computing device 704 are securely paired). In block 416, the second computing device 704 checks for hardware key revocation (e.g., EPID key) of the first computing device 702 based on the group identification of the first computing device 702 and one or more revocation lists. In various embodiments, the second computing device 704 may check for group identification-based revocation, private key-based revocation, and/or signature key-based revocation.

In block 418, the second computing device 704 determines whether there is hardware key revocation (e.g., group identification-based revocation, private key-based revocation, and/or signature key-based revocation) of the first computing device 702. If so, the second computing device 704 performs an error handling function or algorithm in block 420. For example, the second computing device 704 may discontinue establishing a secure pairing with the first computing device 702, disconnect the communication link with the first computing device 702, or otherwise handle the error. However, if there is no hardware key revocation of the first computing device 702, the method 400 advances to block 422 of FIG. 5 in which the second computing device 704 signs the set of Diffie-Hellman public keys, $DH_{pub1}$ and $DH_{pub2}$, with the private hardware key ($HW_2$) of the second computing device 704. It should be appreciated that, in some embodiments, the Diffie-Hellman public keys are concatenated in a particular order known to both the first computing device 702 and the second computing device 704 and signed with the private hardware key (e.g., $Sig_{HW2}$ ($DH_{pub2}\|DH_{pub1}$)). In other embodiments, $DH_{pub1}$ and $DH_{pub2}$ may be signed, for example, in any other suitable order or structure. As discussed above, in some embodiments, the private hardware key of the second computing device 704 is a private EPID key.

Figure 5:
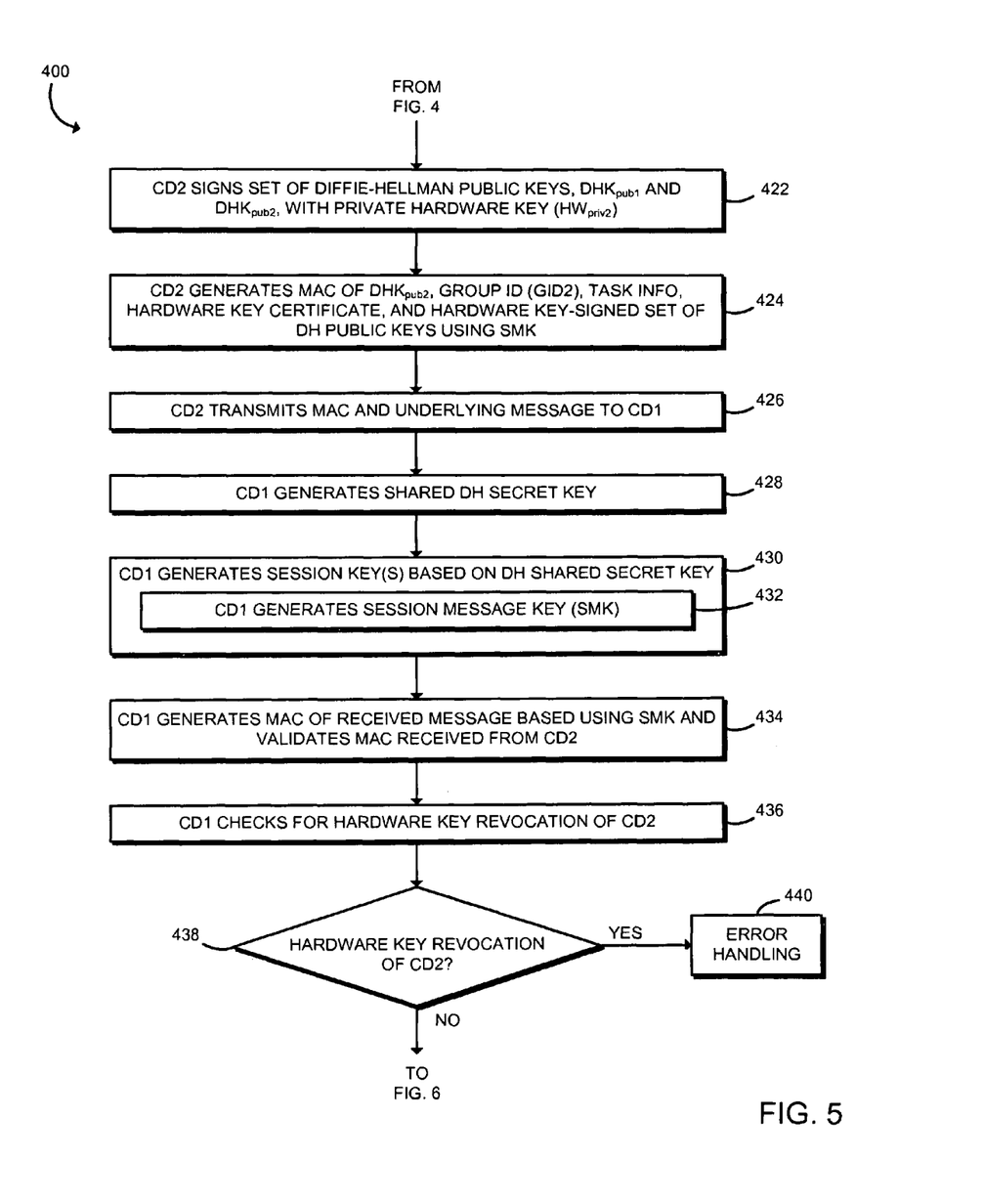

In block 424, the second computing device 704 generates a MAC of a message including the Diffie-Hellman public key ($DH_{pub2}$), the group identification (GID2) of the second computing device 704, task information, a hardware key certificate, and the hardware key-signed set of Diffie-Hellman public keys (i.e., Diffie-Hellman public keys signed by the private hardware key, $HW_2$, of the second computing device 704) using the session message key generated by the second computing device 704. Of course, in another embodiment, the second computing device 704 may utilize another type of keyed hash and/or use a different shared key as the MAC or hash key. Additionally, the message may be generated and/or organized in any suitable manner. For example, in one embodiment, the group identification, task information, hardware key certification, and hardware key-signed set of Diffie-Hellman public key may be concatenated to one another in a specified order (e.g., an order known to both the first computing device 702 and the second computing device 704) to generate the message. As discussed above, the hardware key certificate may be signed by the manufacturer of the corresponding hardware component of the second computing device 704 (e.g., the security co-processor). Additionally, it should be appreciated that, in some embodiments, the private hardware key and the hardware key certificate are provisioned into the corresponding hardware component or secure memory accessible by the hardware component during the manufacturing process (or subsequent to the manufacturing process). In another embodiment, the hardware key certificate may alternatively be signed by a party attesting to the identity and/or integrity of the corresponding hardware component and/or trusted execution environment module. The task information may include information regarding the hardware component and/or information regarding a task to be completed. In some embodiments, information such as the task information, for example, may not be included in the message, whereas in other embodiments, additional information may be included in the message.

In block 426, the second computing device 704 transmits the MACed message (i.e., the MAC and the underlying message) to the first computing device 702 (see, e.g., data flow 708 of FIG. 7 in which EPID keys and certificates are utilized). It should be appreciated that by signing the Diffie-Hellman public keys, the second computing device 704 proves that the Diffie-Hellman public keys have not been modified while establishing the secure pairing. In block 428, the first computing device 702 generates the shared Diffie-Hellman secret key based on the Diffie-Hellman private key, $DH_{priv1}$, of the first computing device 702 and the Diffie-Hellman public key, $DH_{pub2}$, received from the second computing device 704. It should be appreciated that the shared Diffie-Hellman secret key generated by the first computing device 702 in block 428 is the same as the shared Diffie-Hellman secret key generated by the second computing device 704 in block 410 of FIG. 4. As discussed above, in other embodiments, another key exchange algorithm or mechanism (e.g., Elliptic Curve Diffie-Hellman) may be implemented to generate a shared secret key between the first computing device 702 and the second computing device 704.

In block 430, the first computing device 702 generates one or more sessions keys based on the generated shared Diffie-Hellman secret key. In the illustrative embodiment, the first computing device 702 generates the same session keys generated by the second computing device 704 in block 412 of FIG. 4. For example, in block 432, the first computing device 702 may generate the session message key (SMK) generated by the second computing device 704 in block 414. The first computing device 702 may use any suitable cryptographic algorithms, functions, and/or mechanisms for doing so. For example, in one embodiment, the first computing device 702 and the second computing device 704 generate the session message key by generating a keyed hash based on the shared Diffie-Hellman secret key and a predetermined value (e.g., 0X0F) known to both the first computing device 702 and the second computing device 704.

In block 434, the first computing device 702 generates a MAC of the message received from the second computing device 704 in block 426 using the session message key and compares the generated MAC with the MAC received with the message in block 426 to validate the received MAC. If the message has not been modified (e.g., by an adversary snooping the transmissions between the first computing device 702 and the second computing device 704 over the network 104) and the session message key generated by the first computing device 702 matches that of the second computing device 704, the generated MAC should match the MAC received from the second computing device 704. If not, the first computing device 702 may execute a suitable process for remedying the error (e.g., re-generating the MAC or discontinuing communication) depending on the embodiment. In block 436, the first computing device 702 checks for hardware key revocation (e.g., EPID key) of the second computing device 704 based on the group identification of the second computing device 704 and the revocation list(s) 126. As described above, the first computing device 702 may check for group identification-based revocation, private key-based revocation, and/or signature key-based revocation depending on the embodiment.

In block 438, the first computing device 702 determines whether there is hardware key revocation (e.g., group identification-based revocation, private key-based revocation, and/or signature key-based revocation) of the second computing device 704. If so, the first computing device 702 executes an error handling function or algorithm in block 440 similar to that described in block 420 of FIG. 4. However, if there is no hardware key revocation of the second computing device 704, the method 400 advances to block 442 of FIG. 6 in which the first computing device 702 validates the hardware key certificate and the hardware key signature of the second computing device 704. As described above, the hardware key certificate of the second computing device 704 may be signed by, for example, the manufacturer of the corresponding hardware component (e.g., security co-processor) of the second computing device 704 and may include the public hardware key corresponding to the private hardware key of the second computing device 704. Accordingly, the first computing device 702 retrieves the public cryptographic key (i.e., the validation key) of the manufacturer corresponding to the private cryptographic key used to sign the certificate (i.e., the signature key). For example, in one embodiment, the first computing device 702 may retrieve the validation key from an external key database (e.g., based on the group identification of the second computing device 704) or from the memory or data storage of the first computing device 702 (e.g., if previously received and stored). The first computing device 702 uses the public hardware key received with the certificate to validate the signature (i.e., the signed set of Diffie-Hellman public keys) of the second computing device 704. As discussed above, in some embodiments, the first computing device 702 compares the Diffie-Hellman public keys that were signed to those discussed previously in establishing the shared Diffie-Hellman secret key to verify that they have not been modified. If the first computing device 702 is unable to validate the hardware key certificate and/or the hardware key signature of the second computing device 704, the first computing device 702 may remedy the error in any suitable way.

Figure 6:
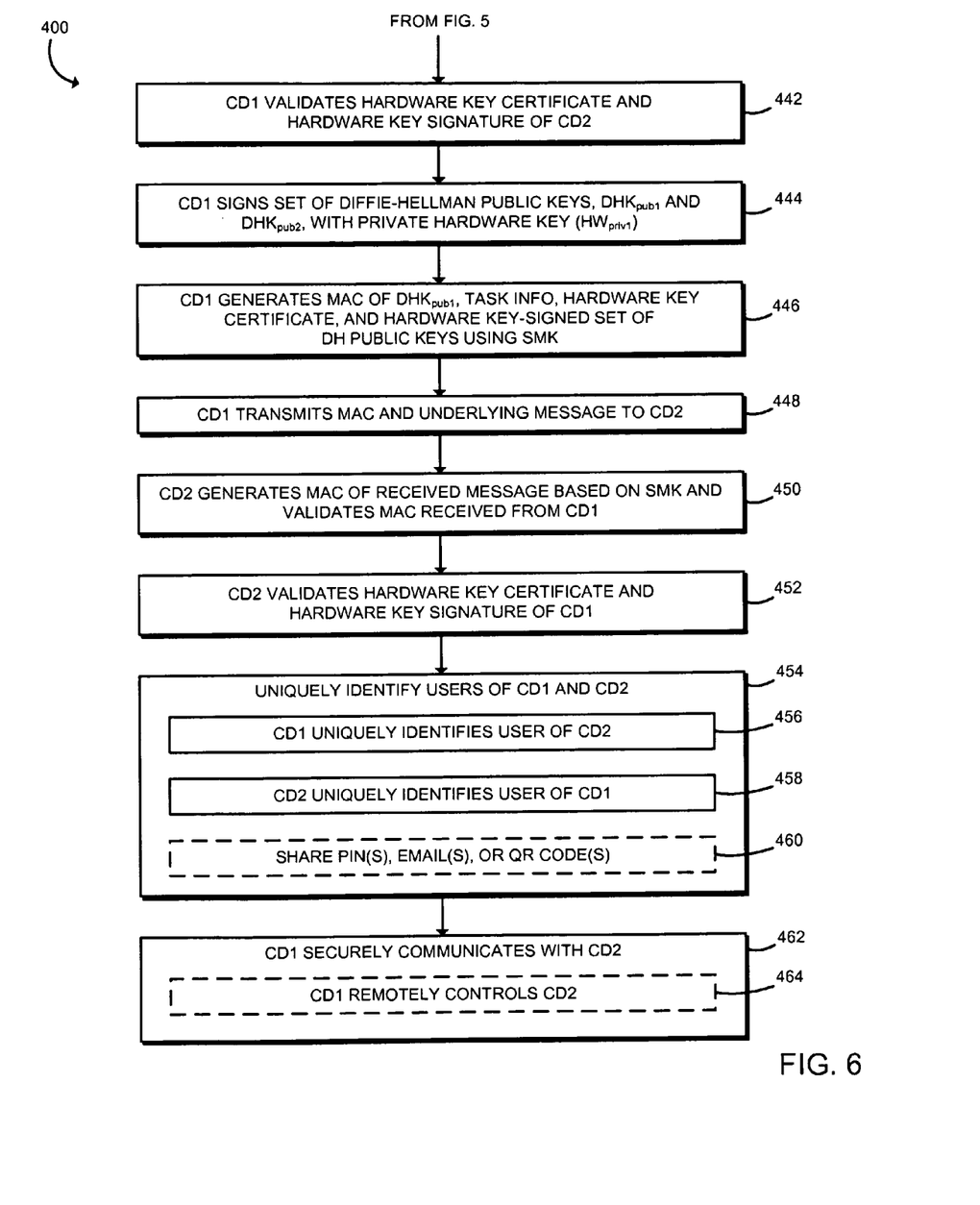

In block 444, the first computing device 702 signs the set of Diffie-Hellman public keys, $DH_{pub1}$ and $DH_{pub2}$, with the private hardware key ($HW_1$) of the first computing device 702. As discussed above, in some embodiments, the Diffie-Hellman public keys are concatenated in a particular order known to both the first computing device 702 and the second computing device 704 and signed with the private hardware key (e.g., $Sig_{HW1}\|DH_{pub2}$)). Additionally, in some embodiments, the private hardware key of the first computing device 702 is a private EPID key. In block 446, the first computing device 702 generates a MAC of a message including the Diffie-Hellman public key ($DH_{pub1}$), task information, a hardware key certificate, and the hardware key-signed set of Diffie-Hellman public keys (i.e., the set of Diffie-Hellman public keys signed by the private hardware key of the of the first computing device 702) using the session message key. As discussed above, in another embodiment, the first computing device 702 may utilize another type of keyed hash and/or a different shared key and may generate and/or organize the message in any suitable manner. In block 448, the first computing device 702 transmits the MACed message to the second computing device 704 (see, e.g., data flow 710 of FIG. 7 in which EPID keys and certificates are utilized).

In block 450, the second computing device 704 generates a MAC of the message received from the first computing device 702 in block 448 using the session message key and compares the generated MAC with the MAC received with the message to validate the received MAC. If there is not a match (i.e., the MAC is not validated), the second computing device 704 may execute any suitable process for remedying the error. In block 452, the second computing device 704 validates the hardware key certificate and the hardware key signature of the first computing device 702. In order to do so, it should be appreciated that the second computing device 704 may employ a process or mechanism similar to that described above in block 442. That is, the hardware key certificate of the first computing device 702 may be validated using a corresponding public cryptographic key of the manufacturer corresponding to the private key used to sign the certificate. Additionally, the hardware key signature of the first computing device 702 may be validated using the public hardware key of the first computing device 702 received with the hardware key certificate.

In block 454, the users of the first computing device 702 and the second computing device 704 are uniquely identified (see data flow 712 of FIG. 7). That is, the first computing device 702 uniquely identifies the current user of the second computing device 704 in block 456. Similarly, the second computing device 704 uniquely identifies the current user of the first computing device 702 in block 458. As discussed above, the computing devices 702, 704 may use any suitable algorithms, functions, and/or mechanisms for doing so. For example, in block 460, the computing devices 702, 704 may share one or more PINs, email addresses, passwords, QR codes, and/or other user-identifying data. A secure pairing between the computing devices 702, 704 is established based on each of the computing devices 702, 704 establishing that the other computing device 702, 704 is operating on a known platform (or has a known secure hardware component) and identifying the particular user of the other computing device 702, 704. Accordingly, the first computing device 702 may securely communicate with the second computing device 704 in block 462. As discussed above, in one embodiment, the first computing device 702 may now remotely control the second computing device 704 in a secure manner. Of course, the second computing device 704 may alternatively securely and remotely control the first computing device 702.

EXAMPLES

Illustrative examples of the technologies disclosed herein are provided below. An embodiment of the technologies may include any one or more, and any combination of, the examples described below.

Example 1 includes a first computing device for securely pairing with a second computing device, the first computing device comprising a trusted execution environment module to generate a session message key based on a key exchange with the second computing device; and a communication module to receive a message that includes a hardware key certificate, a cryptographically-signed communication, and a message authentication code from the second computing device, the cryptographically-signed communication signed with a private hardware key of the second computing device, wherein the trusted execution environment module is further to (i) validate the message authentication code based on the message and the session message key, (ii) validate the certificate and the signature received from the second computing device, and (iii) identify a user of the second computing device based on user-identifying data received from the second computing device in response to validation of the message authentication code, the certificate, and the signature.

Example 2 includes the subject matter of Example 1, and wherein to generate the session message key comprises to perform a Diffie-Hellman key exchange with the second computing device.

Example 3 includes the subject matter of any of Examples 1 and 2, and wherein to generate the session message key comprises to generate the session message key based on a shared Diffie-Hellman secret key.

Example 4 includes the subject matter of any of Examples 1-3, and wherein the trusted execution environment is further to generate at least one other session key based on the key exchange with the second computing device, the at least one other session key to encrypt communications subsequent to the secure pairing.

Example 5 includes the subject matter of any of Examples 1-4, and wherein to receive the message comprises to receive a message that includes a hardware key certificate that includes a public hardware key corresponding to the private hardware key of the second computing device.

Example 6 includes the subject matter of any of Examples 1-5, and wherein to receive the message comprises to receive a message that includes a hardware key certificate signed by a manufacturer of a corresponding hardware component.

Example 7 includes the subject matter of any of Examples 1-6, and wherein to validate the certificate comprises to retrieve a public key of the manufacturer that corresponds to a private key used to sign the hardware key certificate.

Example 8 includes the subject matter of any of Examples 1-7, and wherein to validate the signature received from the second computing device comprises to apply the public hardware key to the cryptographically-signed communication.

Example 9 includes the subject matter of any of Examples 1-8, and wherein to receive the message comprises to receive a message that includes an Enhanced Privacy Identification certificate, the cryptographically-signed communication signed with a private Enhanced Privacy Identification key of the second computing device that corresponds to a public Enhanced Privacy Identification key identified on the Enhanced Privacy Identification certificate.

Example 10 includes the subject matter of any of Examples 1-9, and wherein to receive the message comprises to receive a message authentication code generated by the second computing device as a function of the session message key.

Example 11 includes the subject matter of any of Examples 1-10, and wherein to receive the message comprises to receive a cryptographically-signed communication that includes a public Diffie-Hellman key of the first computing device and a public Diffie-Hellman key of the second computing device.

Example 12 includes the subject matter of any of Examples 1-11, and wherein the communication module is further to transmit a hardware group identification of the first computing device to the second computing device, wherein receipt of the message is indicative that the second computing device has determined the hardware group identification is not identified on a revocation list.

Example 13 includes the subject matter of any of Examples 1-12, and wherein to transmit the hardware group identification comprises to transmit a hardware group identification that corresponds to the identity of a hardware component of the first computing device.

Example 14 includes the subject matter of any of Examples 1-13, and wherein a hardware group identification of the second computing device is (i) included in the message or (ii) received in a separate message, and wherein the trusted execution environment module is further to verify that the hardware group identification of the second computing device is not included in a revocation list that identifies revoked hardware group identifications.

Example 15 includes the subject matter of any of Examples 1-14, and wherein the communication module is further to transmit another message that includes a second hardware key certificate, a second cryptographically-signed communication, and a second message authentication code to the second computing device, wherein the second cryptographically-signed communication is signed with a private hardware key of the first computing device, the second message authentication code is generated by the first computing device as a function of the session message key, and the second hardware key certificate includes a public hardware key that corresponds to the private hardware key of the first computing device.

Example 16 includes the subject matter of any of Examples 1-15, and wherein to identify the user of the second computing device is further in response to validation of the second message authentication code, the second hardware key certificate, and the second cryptographically-signed communication by the second computing device.

Example 17 includes the subject matter of any of Examples 1-16, and wherein to identify the user of the second computing device comprises to receive, from the second computing device, at least one of a personal identification number of the user, an email of the user, and a quick response code of the user.

Example 18 includes the subject matter of any of Examples 1-17, and wherein the trusted execution environment module is further to establish an access control policy that defines a manner in which the first computing device may access hardware and software resources of the second computing device.

Example 19 includes a method for securely pairing a first computing device with a second computing device, the method comprising generating, on the first computing device, a session message key based on a key exchange with the second computing device; receiving, by the first computing device, a message including a hardware key certificate, a cryptographically-signed communication, and a message authentication code from the second computing device, the cryptographically-signed communication signed with a private hardware key of the second computing device; validating, by the first computing device, the message authentication code based on the message and the session message key; validating, by the first computing device, the certificate and the signature received from the second computing device; and identifying, on the first computing device, a user of the second computing device based on user-identifying data received from the second computing device in response to validating the message authentication code, the certificate, and the signature.

Example 20 includes the subject matter of Example 19, and wherein generating the session message key comprises performing a Diffie-Hellman key exchange with the second computing device.

Example 21 includes the subject matter of any of Examples 19 and 20, and wherein generating the session message key comprises generating the session message key based on a shared Diffie-Hellman secret key.

Example 22 includes the subject matter of any of Examples 19-21, and further including generating, on the first computing device, at least one other session key based on the key exchange with the second computing device, the at least one other session key to encrypt communications subsequent to the secure pairing.

Example 23 includes the subject matter of any of Examples 19-22, and wherein receiving the message comprises receiving a message including a hardware key certificate that includes a public hardware key corresponding to the private hardware key of the second computing device.

Example 24 includes the subject matter of any of Examples 19-23, and wherein receiving the message comprises receiving a message including a hardware key certificate signed by a manufacturer of a corresponding hardware component.

Example 25 includes the subject matter of any of Examples 19-24, and wherein validating the certificate comprises retrieving a public key of the manufacturer corresponding to a private key used to sign the hardware key certificate.

Example 26 includes the subject matter of any of Examples 19-25, and wherein validating the signature received from the second computing device comprises applying the public hardware key to the cryptographically-signed communication.

Example 27 includes the subject matter of any of Examples 19-26, and wherein receiving the message comprises receiving a message including an Enhanced Privacy Identification certificate, the cryptographically-signed communication signed with a private Enhanced Privacy Identification key of the second computing device corresponding to a public Enhanced Privacy Identification key identified on the Enhanced Privacy Identification certificate.

Example 28 includes the subject matter of any of Examples 19-27, and wherein receiving the message comprises receiving a message authentication code generated by the second computing device as a function of the session message key.

Example 29 includes the subject matter of any of Examples 19-28, and wherein receiving the message comprises receiving a cryptographically-signed communication, the communication including a public Diffie-Hellman key of the first computing device and a public Diffie-Hellman key of the second computing device.

Example 30 includes the subject matter of any of Examples 19-29, and further including transmitting, from the first computing device, a hardware group identification of the first computing device to the second computing device, wherein receipt of the message is indicative that the second computing device has determined the hardware group identification is not identified on a revocation list.

Example 31 includes the subject matter of any of Examples 19-30, and wherein transmitting the hardware group identification comprises transmitting a hardware group identification corresponding to the identity of a hardware component of the first computing device.

Example 32 includes the subject matter of any of Examples 19-31, and further including receiving a hardware group identification of the second computing device, the hardware group identification of the second computing device being (i) included in the message or (ii) received in a separate message, and verifying that the hardware group identification of the second computing device is not included in a revocation list that identifies revoked hardware group identifications.

Example 33 includes the subject matter of any of Examples 19-32, and further including transmitting, from the first computing device, another message including a second hardware key certificate, a second cryptographically-signed communication, and a second message authentication code to the second computing device, wherein the second cryptographically-signed communication is signed with a private hardware key of the first computing device, the second message authentication code is generated by the first computing device as a function of the session message key, and the second hardware key certificate includes a public hardware key corresponding to the private hardware key of the first computing device.

Example 34 includes the subject matter of any of Examples 19-33, and wherein identifying the user of the second computing device is further in response to validation of the second message authentication code, the second hardware key certificate, and the second cryptographically-signed communication by the second computing device.

Example 35 includes the subject matter of any of Examples 19-34, and wherein identifying the user of the second computing device comprises receiving, from the second computing device, at least one of a personal identification number of the user, an email of the user, and a quick response code of the user.

Example 36 includes the subject matter of any of Examples 19-35, and further including establishing, with the first computing device, an access control policy defining a manner in which the first computing device may access hardware and software resources of the second computing device.

Example 37 includes a computing device comprising a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a first computing device for securely pairing to a second computing device, the first computing device comprising means for generating a session message key based on a key exchange with the second computing device; means for receiving a message including a hardware key certificate, a cryptographically-signed communication, and a message authentication code from the second computing device, the cryptographically-signed communication signed with a private hardware key of the second computing device; means for validating the message authentication code based on the message and the session message key; means for validating the certificate and the signature received from the second computing device; and means for identifying a user of the second computing device based on user-identifying data received from the second computing device in response to validating the message authentication code, the certificate, and the signature.

Example 40 includes the subject matter of Example 39, and wherein the means for generating the session message key comprises means for performing a Diffie-Hellman key exchange with the second computing device.

Example 41 includes the subject matter of any of Examples 39 and 40, and wherein the means for generating the session message key comprises means for generating the session message key based on a shared Diffie-Hellman secret key.

Example 42 includes the subject matter of any of Examples 39-41, and further including means for generating at least one other session key based on the key exchange with the second computing device, the at least one other session key to encrypt communications subsequent to the secure pairing.

Example 43 includes the subject matter of any of Examples 39-42, and wherein the means for receiving the message comprises means for receiving a message including a hardware key certificate that includes a public hardware key corresponding to the private hardware key of the second computing device.

Example 44 includes the subject matter of any of Examples 39-43, and wherein the means for receiving the message comprises means for receiving a message including a hardware key certificate signed by a manufacturer of a corresponding hardware component.

Example 45 includes the subject matter of any of Examples 39-44, and wherein the means for validating the certificate comprises means for retrieving a public key of the manufacturer corresponding to a private key used to sign the hardware key certificate.

Example 46 includes the subject matter of any of Examples 39-45, and wherein the means for validating the signature received from the second computing device comprises means for applying the public hardware key to the cryptographically-signed communication.

Example 47 includes the subject matter of any of Examples 39-46, and wherein the means for receiving the message comprises means for receiving a message including an Enhanced Privacy Identification certificate, the cryptographically-signed communication signed with a private Enhanced Privacy Identification key of the second computing device corresponding to a public Enhanced Privacy Identification key identified on the Enhanced Privacy Identification certificate.

Example 48 includes the subject matter of any of Examples 39-47, and wherein the means for receiving the message comprises means for receiving a message authentication code generated by the second computing device as a function of the session message key.

Example 49 includes the subject matter of any of Examples 39-48, and wherein the means for receiving the message comprises means for receiving a cryptographically-signed communication, the communication including a public Diffie-Hellman key of the first computing device and a public Diffie-Hellman key of the second computing device.

Example 50 includes the subject matter of any of Examples 39-49, and further including means for transmitting a hardware group identification of the first computing device to the second computing device, wherein receipt of the message is indicative that the second computing device has determined the hardware group identification is not identified on a revocation list.

Example 51 includes the subject matter of any of Examples 39-50, and wherein the means for transmitting the hardware group identification comprises means for transmitting a hardware group identification corresponding to the identity of a hardware component of the first computing device.

Example 52 includes the subject matter of any of Examples 39-51, and further including means for receiving a hardware group identification of the second computing device, the hardware group identification of the second computing device being (i) included in the message or (ii) received in a separate message, and means for verifying that the hardware group identification of the second computing device is not included in a revocation list that identifies revoked hardware group identifications.

Example 53 includes the subject matter of any of Examples 39-52, and further including means for transmitting another message including a second hardware key certificate, a second cryptographically-signed communication, and a second message authentication code to the second computing device, wherein the second cryptographically-signed communication is signed with a private hardware key of the first computing device, the second message authentication code is generated by the first computing device as a function of the session message key, and the second hardware key certificate includes a public hardware key corresponding to the private hardware key of the first computing device.

Example 54 includes the subject matter of any of Examples 39-53, and wherein the means for identifying the user of the second computing device comprises means for identifying the user of the second computing device in response to validation of the second message authentication code, the second hardware key certificate, and the second cryptographically-signed communication by the second computing device.

Example 55 includes the subject matter of any of Examples 39-54, and wherein the means for identifying the user of the second computing device comprises means for receiving, from the second computing device, at least one of a personal identification number of the user, an email of the user, and a quick response code of the user.

Example 56 includes the subject matter of any of Examples 39-55, and further including means for establishing an access control policy defining a manner in which the first computing device may access hardware and software resources of the second computing device.

The invention claimed is:

1. A first computing device for securely pairing with a second computing device, the first computing device comprising:
a trusted execution environment module to generate a session message key based on a key exchange with the second computing device; and
a communication module to receive a hardware group identification of the second computing device and a message that includes a hardware key certificate, a cryptographically-signed communication, and a message authentication code from the second computing device, the cryptographically-signed communication signed with a private hardware key of the second computing device,
wherein the trusted execution environment module is further to:
validate the message authentication code based on the message and the session message key;
verify that the hardware group identification is not within a revocation list that is indicative of revoked hardware group identifications;
validate the certificate and the signature received from the second computing device; and
identify a user of the second computing device based on user-identifying data received from the second computing device in response to validation of the message authentication code, the certificate, and the signature.

2. The first computing device of claim 1, wherein to receive the message comprises to receive a message that includes a hardware key certificate that includes a public hardware key corresponding to the private hardware key of the second computing device.

3. The first computing device of claim 2, wherein to receive the message comprises to receive a message that includes a hardware key certificate signed by a manufacturer of a corresponding hardware component.

4. The first computing device of claim 3, wherein to validate the certificate comprises to retrieve a public key of the manufacturer that corresponds to a private key used to sign the hardware key certificate.

5. The first computing device of claim 2, wherein to validate the signature received from the second computing device comprises to apply the public hardware key to the cryptographically-signed communication.

6. The first computing device of claim 2, wherein to receive the message comprises to receive a message that includes an Enhanced Privacy Identification certificate, the cryptographically-signed communication signed with a private Enhanced Privacy Identification key of the second computing device that corresponds to a public Enhanced Privacy Identification key identified on the Enhanced Privacy Identification certificate.

7. The first computing device of claim 1, wherein to receive the message comprises to receive a message authentication code generated by the second computing device as a function of the session message key.

8. The first computing device of claim 1, wherein the communication module is further to transmit a hardware group identification of the first computing device to the second computing device, wherein receipt of the message is indicative that the second computing device has determined the hardware group identification of the first computing device is not identified on a second revocation list and the hardware group identification of the first computing device corresponds to the identity of a hardware component of the first computing device.

9. The first computing device of claim 1, wherein the communication module is further to transmit another message that includes a second hardware key certificate, a second cryptographically-signed communication, and a second message authentication code to the second computing device, wherein
the second cryptographically-signed communication is signed with a private hardware key of the first computing device,
the second message authentication code is generated by the first computing device as a function of the session message key, and
the second hardware key certificate includes a public hardware key that corresponds to the private hardware key of the first computing device.

10. The first computing device of claim 9, wherein to identify the user of the second computing device is further in response to validation of the second message authentication code, the second hardware key certificate, and the second cryptographically-signed communication by the second computing device.

11. The first computing device of claim 1, wherein to identify the user of the second computing device comprises to receive, from the second computing device, at least one of a personal identification number of the user, an email of the user, and a quick response code of the user.

12. One or more non-transitory machine readable storage media comprising a plurality of instructions stored thereon that, in response to being executed, cause a computing device to:
generate a session message key based on a key exchange with a second computing device;
receive a hardware group identification of the second computing device and a message including a hardware key certificate, a cryptographically-signed communication, and a message authentication code from the second computing device, the cryptographically-signed communication signed with a private hardware key of the second computing device;
validate the message authentication code based on the message and the session message key;
verify that the hardware group identification is not within a revocation list that is indicative of revoked hardware group identifications;
validate the certificate and the signature received from the second computing device; and
identify a user of the second computing device based on user-identifying data received from the second computing device in response to validation of the message authentication code, the certificate, and the signature.

13. The one or more non-transitory machine readable storage media of claim 12, wherein to receive the message comprises to receive a message including a hardware key certificate that includes a public hardware key corresponding to the private hardware key of the second computing device and is signed by a manufacturer of a corresponding hardware component.

14. The one or more non-transitory machine readable storage media of claim 13, wherein to:
validate the certificate comprises to retrieve a public key of the manufacturer corresponding to a private key used to sign the hardware key certificate; and
validate the signature received from the second computing device comprises to apply the public hardware key to the cryptographically-signed communication.

15. The one or more non-transitory machine readable storage media of claim 13, wherein to receive the message comprises to receive a message including an Enhanced Privacy Identification certificate, the cryptographically-signed communication signed with a private Enhanced Privacy Identification key of the second computing device corresponding to a public Enhanced Privacy Identification key identified on the Enhanced Privacy Identification certificate.

16. The one or more non-transitory machine readable storage media of claim 12, wherein to receive the message comprises to receive a message authentication code generated by the second computing device as a function of the session message key.

17. The one or more non-transitory machine readable storage media of claim 12, wherein the plurality of instructions further cause the computing device to transmit a hardware group identification corresponding to the identity of a hardware component of the first computing device to the second computing device, wherein receipt of the message is indicative that the second computing device has determined the hardware group identification is not identified on a second revocation list.

18. The one or more non-transitory machine readable storage media of claim 12, wherein the plurality of instructions further cause the computing device to transmit another message including a second hardware key certificate, a second cryptographically-signed communication, and a second message authentication code to the second computing device, wherein
the second cryptographically-signed communication is signed with a private hardware key of the first computing device,
the second message authentication code is generated by the first computing device as a function of the session message key, and
the second hardware key certificate includes a public hardware key corresponding to the private hardware key of the first computing device.

19. The one or more non-transitory machine readable storage media of claim 18, wherein to identify the user of the second computing device is further in response to validation of the second message authentication code, the second hardware key certificate, and the second cryptographically-signed communication by the second computing device.

20. A method for securely pairing a first computing device with a second computing device, the method comprising:
- generating, on the first computing device, a session message key based on a key exchange with the second computing device;
- receiving, by the first computing device, a hardware group identification of the second computing device and a message including a hardware key certificate, a cryptographically-signed communication, and a message authentication code from the second computing device, the cryptographically-signed communication signed with a private hardware key of the second computing device;
- validating, by the first computing device, the message authentication code based on the message and the session message key;
- verifying, by the first computing device, that the hardware group identification is not within a revocation list that is indicative of revoked hardware group identifications;
- validating, by the first computing device, the certificate and the signature received from the second computing device; and
- identifying, on the first computing device, a user of the second computing device based on user-identifying data received from the second computing device in response to validating the message authentication code, the certificate, and the signature.

21. The method of claim 20, wherein:
- receiving the message comprises receiving a message including a hardware key certificate that includes a public hardware key corresponding to the private hardware key of the second computing device and is signed by a manufacturer of a corresponding hardware component;
- validating the certificate comprises retrieving a public key of the manufacturer corresponding to a private key used to sign the hardware key certificate; and
- validating the signature received from the second computing device comprises applying the public hardware key to the cryptographically-signed communication.

22. The method of claim 21, wherein receiving the message comprises receiving a message including an Enhanced Privacy Identification certificate, the cryptographically-signed communication signed with a private Enhanced Privacy Identification key of the second computing device corresponding to a public Enhanced Privacy Identification key identified on the Enhanced Privacy Identification certificate.

23. The method of claim 20, further comprising
- transmitting, from the first computing device, a hardware group identification corresponding to the identity of a hardware component of the first computing device to the second computing device, wherein receipt of the message is indicative that the second computing device has determined the hardware group identification of the first computing device is not identified on a second revocation list.

* * * * *